UNITED STATES PATENT OFFICE.

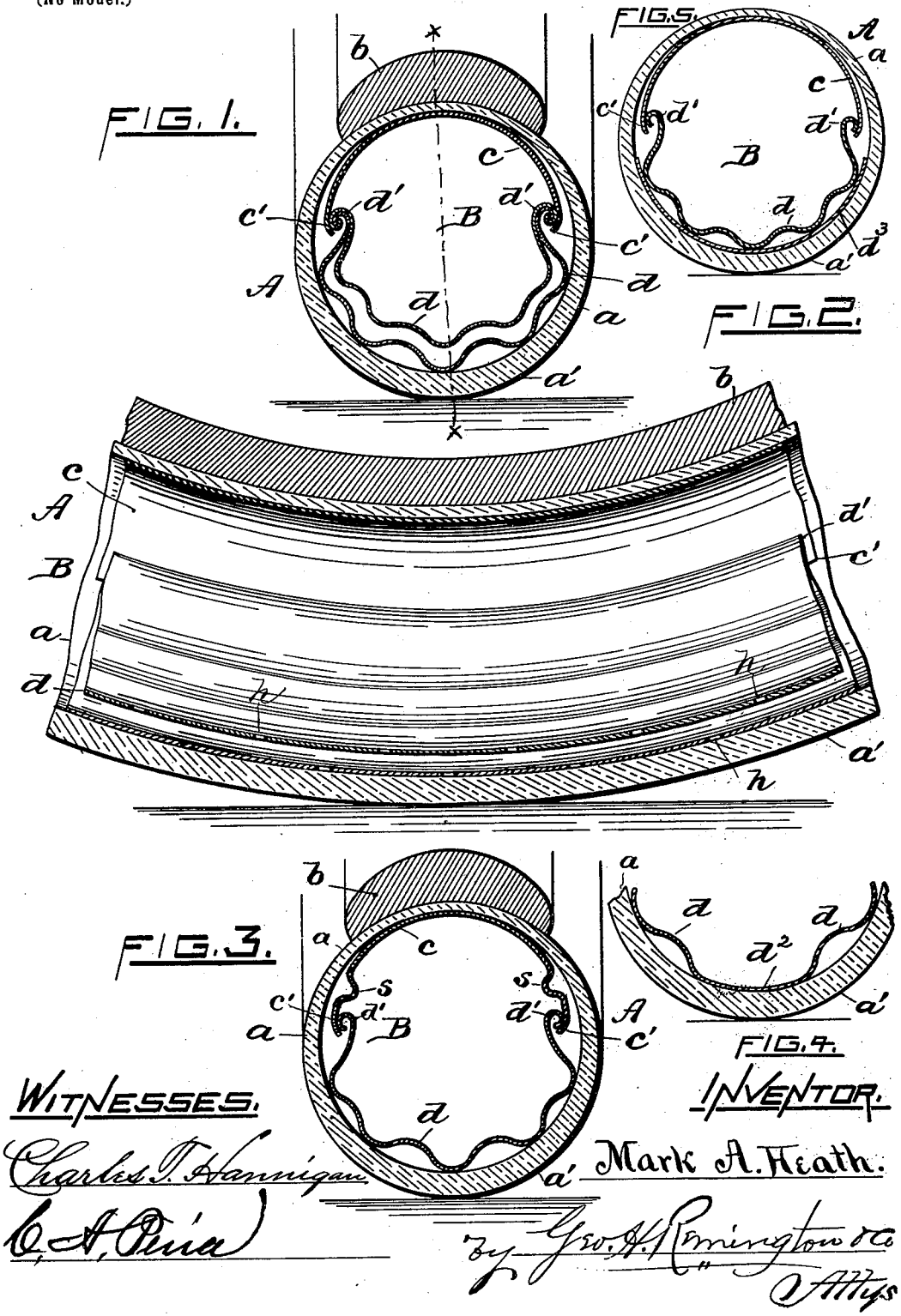

MARK A. HEATH, OF PROVIDENCE, RHODE ISLAND, ASSIGNOR TO MARK A. HEATH, JR., AND CHARLES HEATH, OF SAME PLACE.

PNEUMATIC TIRE.

SPECIFICATION forming part of Letters Patent No. 676,395, dated June 11, 1901.

Application filed October 4, 1900. Serial No. 31,966. (No model.)

*To all whom it may concern:*

Be it known that I, MARK A. HEATH, a citizen of the United States of America, and a resident of Providence, in the county of Providence and State of Rhode Island, have invented certain new and useful Improvements in Pneumatic Tires, of which the following is a specification.

My invention relates to improvements in pneumatic tires for bicycle and other wheels; and it consists, essentially, in the combination, with the usual air-cushioned single tire, of rubber, of a continuous thin sheet-metal corrugated annular lining mounted within and conforming to the curvature of the tube, its form cross-sectionally being substantially U-shaped, and an oppositely-arranged annular lining member, of sheet metal, having its sides adapted to bear against the adjacent surfaces of the end portions of the two yielding lateral sides of the other lining member, whereby the movements of the latter when in use are maintained within fixed limits, while at the same time the resiliency and strength of the rubber tube itself remain practically unimpaired.

In protected or metal-lined tires as usually made the lining or non-puncturable member is embedded in the rubber in the process of manufacture, thus rendering the tire to a certain extent non-collapsible. In other cases the metal lining or shield is confined between the adjacent surfaces of outer and inner tubes of rubber. In such former devices the action of the tire is liable to and, in fact, does cause the edges of the shield to wear away the contiguous rubber, thereby impairing the strength and efficiency of the tire.

The object I have in view is to overcome the disadvantages inherent in inflatable tires provided with metallic linings constructed and arranged as just described. In my improved rubber tire, which is of the inflatable or air-cushion type, the device while not rendering it absolutely non-puncturable serves to maintain the tire in a practically normal or distended condition, even though the tire be punctured, the device at the same time giving to the tire a considerable degree of resiliency and strength, so that the wheel is not rendered unserviceable, though punctured. The weight of the tire and the cost of the same is not materially increased by the addition of the metallic lining forming the subject of my present invention.

In the accompanying sheet of drawings, Figure 1 is a transverse or cross-sectional view of a pneumatic tire embodying my improvements. Fig. 2 is a longitudinal central sectional view taken on line $x\ x$ of Fig. 1. Fig. 3 is a sectional view similar to Fig. 1, showing a modification of the device. Fig. 4 is a partial cross-section showing a slight change in the form of the outer lining member; and Fig. 5 is a cross-sectional view of the tire, showing a fixed plate interposed between the outer lining member and the corresponding inner surface of the rubber tube.

The following is a more detailed description of the construction and manner of operation of my improved bicycle-tire.

The tire as a whole is indicated by A. The tire proper is practically an endless or annular inflatable rubber tube $a$, adapted to be secured to or mounted on a wheel-rim $b$, substantially as usual. As commonly constructed such tubes are made somewhat thicker at the center portion of the outer periphery, as shown at $a'$, thereby increasing its durability, while at the same time lessening the chances of its being punctured. Within the rubber tube $a$ is located the yielding lining or supporting members comprising my improvement. This lining consists of at least two endless or annular members, each being substantially semicircular cross-sectionally and made of suitable thin sheet metal, as steel. The inner member $c$ of said lining—that is, the one contiguous to the wheel-rim $b$—is plain and having its two side edges bent inwardly, substantially as shown at $c'$. The form cross-sectionally conforms approximately to that of the corresponding surface of the rubber tire $a$ and is in contact therewith. The other or coacting fellow member $d$ of the lining is corrugated cross-sectionally and is arranged opposite the member $c$, its two side edges $d'$ being suitably bent and in yielding slidable frictional engagement with the said side portions of the member $c$. The tire $a$ when normally inflated may have its interior surface resting upon the corrugations of the lining member $d$, as represented in the drawings. As thus constructed it will be apparent that the two members $c$ $d$ are somewhat resilient or yielding in a lateral direction, and particularly so at the points of contact $c'$ $d'$ with each other.

In the manufacture of a pneumatic tire A embodying my improvement the suitably-prepared resilient or spring lining members $c$ $d$ may be placed in a mold containing the rubber tube before the latter is united together, and the whole then subjected to a degree of heat capable of vulcanizing the rubber in a well-known manner, thereby producing a seamless annular tube $a$, containing the metallic lining, substantially as represented in the drawings. The tire should be provided with the usual valve, through which the tire may be inflated. In the operation of inflating the tire the pressure of air may distend it so that a narrow space is formed between the adjacent surfaces of the tube and the lining member $d$. Now the wheels of a bicycle or other vehicle provided with my improved tire A when brought into use will in adapting themselves to the contour or character of the road or surface over which the vehicle is propelled become more or less flattened. In fact, the rubber tube $a$ may then bear directly upon the outer or corrugated member $d$, as shown. Additional weight or pressure upon the outside of the tire depresses the part $d$ and forces the sides $c'$ of the other member $c$ outwardly in a lateral direction, thereby stiffening and strengthening the tire and preventing the rubber tube $a$ from being overstrained.

In case a greater degree of stiffness is required within the tire the lining member $d$ may consist of two parts, as shown in Fig. 1. In Fig. 4 I have represented a modification of the member $d$, the construction being such that the center portion $d^2$ thereof is substantially flat or conforming cross-sectionally to the shape of the rubber tire or tube.

In order that the air forced into the tire-chamber B may have free circulation therein, the metal members $d$ may be perforated with holes $h$ at suitable intervals. (See Fig. 2.)

I would add that in case the air under pressure should escape from the tire, or, in other words, become deflated, the wheel even then may be used by the rider without serious inconvenience, as the spring lining members then serve to maintain the tire in an approximately normal shape.

If desired, the sides of the practically stationary lining member $c$ may be provided with oppositely-arranged projections $s$, the same forming stops for arresting and limiting the depressed movement of the outer lining $d$. (See Fig. 3.)

In Fig. 5 I have represented an auxiliary sheet-metal lining member $d^3$, the same extending partly around and conforming cross-sectionally to the shape of the rubber tube $a$ and being interposed between the adjacent surfaces of the tube and member $d$, thereby transmitting and distributing more evenly to the corrugated part $d$ the weight or pressure to which the tire is subjected when in use.

I do not claim, broadly, as my invention a pneumatic tire having metallic plates or spring lining members therein; but What I do claim, and desire to secure by United States Letters Patent, is—

1. The combination within an elastic or pneumatic tire, of a circularly-arranged transversely grooved or corrugated thin metallic lining member $d$, a fellow lining member arranged opposite to and forming the complement of said member $d$, said members being in yielding engagement with each other and with the inner surface of the tire, and having stops $s$ adapted to limit the degree of compressibility of the tire, substantially as described.

2. In a pneumatic tire, the combination with the inflatable rubber tube $a$, of the normally-stationary spring lining member $c$ located within and fitting that portion of the tube adapted to lie contiguous to the wheel-rim, and an oppositely-arranged perforated movable lining or fellow member $d$ also mounted within the tube having its two sides in yielding frictional engagement with the corresponding sides of said member $c$, whereby upon depressing the tire the part $d$ is correspondingly actuated, which in turn forces apart the sides of the said part $c$, and stops for limiting the radial movement of the member $d$, substantially as described.

Signed by me at Providence, Rhode Island, this 2d day of October, A. D. 1900.

MARK A. HEATH.

Witnesses:
 GEO. H. REMINGTON,
 C. A. PIERCE.